US008769383B2

(12) United States Patent
Lamy-Bergot et al.

(10) Patent No.: US 8,769,383 B2
(45) Date of Patent: Jul. 1, 2014

(54) METHOD FOR PROTECTING MULTIMEDIA DATA USING ADDITIONAL NETWORK ABSTRACTION LAYERS (NAL)

(75) Inventors: Catherine Lamy-Bergot, Paris (FR); Cyril Bergeron, Paris (FR)

(73) Assignee: Thales, Neuilly-sur-Seine (FR)

( * ) Notice: Subject to any disclaimer, the term of this patent is extended or adjusted under 35 U.S.C. 154(b) by 1362 days.

(21) Appl. No.: 12/282,900

(22) PCT Filed: Mar. 13, 2007

(86) PCT No.: PCT/EP2007/052363
§ 371 (c)(1),
(2), (4) Date: Feb. 11, 2009

(87) PCT Pub. No.: WO2007/107482
PCT Pub. Date: Sep. 27, 2007

(65) Prior Publication Data
US 2009/0177949 A1 Jul. 9, 2009

(30) Foreign Application Priority Data

Mar. 17, 2006 (FR) ..................................... 06/02380

(51) Int. Cl.
*H03M 13/03* (2006.01)
*G06F 11/08* (2006.01)

(52) U.S. Cl.
USPC ............ 714/776; 370/474; 386/263; 348/456

(58) Field of Classification Search
CPC ... H03M 13/03; G06F 11/08; H04L 29/06095
USPC ............ 370/474; 714/776; 386/263; 348/456
See application file for complete search history.

(56) References Cited

U.S. PATENT DOCUMENTS

| 6,819,658 | B1 | 11/2004 | Agarwal et al. |
| 7,505,485 | B2 * | 3/2009 | Sullivan et al. ............... 370/474 |
| 2002/0027911 | A1 | 3/2002 | Burkert et al. |
| 2005/0008240 | A1 * | 1/2005 | Banerji et al. ................ 382/238 |
| 2005/0031308 | A1 * | 2/2005 | Fu et al. .......................... 386/94 |
| 2005/0254526 | A1 * | 11/2005 | Wang et al. .................... 370/503 |

FOREIGN PATENT DOCUMENTS

| EP | 1592160 | 11/2005 |
| WO | WO9514971 | 6/1995 |
| WO | WO2005107123 | 11/2005 |

* cited by examiner

*Primary Examiner* — M. Mujtaba K Chaudry
(74) *Attorney, Agent, or Firm* — Lowe Hauptman & Ham, LLP (57) ABSTRACT

A method for protecting multimedia data encoded by the H.264 standard, the data being encapsulated in a structure of the network abstraction layer or NAL type, characterized in that the user inserts at least one redundancy NAL containing the error-correcting code used for transmitting the data.

10 Claims, 7 Drawing Sheets

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| N | 128 | 128 | 128 | 128 | 128 | 128 | 128 | 255 | 255 | 255 | 255 | 255 | 255 | 255 | 255 | 255 |
| K | 16 | 32 | 43 | 64 | 85 | 102 | 120 | 32 | 64 | 102 | 128 | 153 | 170 | 191 | 232 | 250 |

METHOD FOR PROTECTING MULTIMEDIA DATA USING ADDITIONAL NETWORK ABSTRACTION LAYERS (NAL)

CROSS-REFERENCE TO RELATED APPLICATIONS

The present Application is based on International Application No. PCT/EP2007/052363, filed on Mar. 13, 2007, which in turn corresponds to French Application No. 0602380, filed on Mar. 17, 2006, and priority is hereby claimed under 35 USC §119 based on these applications. Each of these applications are hereby incorporated by reference in their entirety into the present application.

FIELD OF THE INVENTION

The invention relates notably to a method making it possible to protect multimedia data by means of inserting additional network abstraction layers into the stream.

BACKGROUND OF THE INVENTION

More particularly, the invention may apply in applications using the standard defined jointly by the ISO MPEG and the Video Coding group (VCEG) of the ITU-T called H.264 or MPEG-4 AVC (Advanced Video Coding) which is a video standard providing a more effective compression than the previous video standards (e.g. H.263, MPEG-2) while having a complexity of use that is reasonable and easily adaptable by the network applications.

Established in May 2003, the final version of the ITU-T reference document (JVT-G050r1) specifies only the aspects of the video coding of the most effective tool known to date. The main applications targeted by H.264 are:
real time duplex voice services (videophony) over cable or wireless (UMTS etc.) with a bit rate of less than 1 Mb/s,
current or high quality video services via satellite, xDSL, or DVD with bit rates of 1 to 8 Mb/s,
low quality video with a lower bit rate such as the Internet (<2 Mb/s).

Extensions to the standard are currently being studied, in particular for high definition television (High profile) and for inserting scalability functions (SVC or Scalable Video Coding group).

The type of errors encountered during transmission and decoding may correspond to errors introduced by a transmission channel, like the family of wireless channels, from the conventional civil channels (e.g. transmissions on UMTS, WiFi, WiMax) to military channels (e.g. HF). These errors may be of the "packet loss" type (the loss of a sequence of bits or bytes), "bit error" (possible inversion of one or more bits or bytes, at random or in bursts), "deletions" (loss of known size and/or position of one, several or a sequence of bits or bytes) or else may result from a mixture of these various incidents.

The error sensitivity of variable-length codes is well known and its catastrophic behavior is infamous, in particular in a standard such as H.264/AVC, where the synchronization markers are present only at the beginning of the NALs. The transmission channels induce noise and fading in the transmitted streams, leading notably to errors.

A good way of preventing too much error propagation is to be able to detect them and, if possible, correct them and not simply mask them when they occur.

The methods used by the prior art to alleviate the problems resulting from the presence of errors are based mainly on:

the transmission of additional redundancy via a second channel or second stream, whether it be at the source (encoding by multiple descriptions, distributed encoding, use of "redundant slices"), on the network (repetition of the ARQ type, addition of FEC redundancy) or at the radio access (FEC),
the direct addition of redundancy in the initial stream, without taking account of the compatibility problem (rarer, more likely present in academic or theoretical works).

It is therefore possible to add redundant slices obtained by multiple description encoding or "redundant slices", which are based on a compression encoding with different reference points or compression coefficients, and not on the principle of error-correcting encoding.

Therefore, if there is an error, the use of the redundant slice will actually make it possible to decode (more or less effectively) the corrupted picture by decoding its duplicate. On the other hand, this will not make it possible to correct the errors that may have appeared, whether they be packet or bit errors.

SUMMARY OF THE INVENTION

The invention relates to a method for protecting data in a transmission system in which the information structure transmitted is in the form of a structure of encapsulation of data used, a structure that can serve as a basis for creating new structures transporting synchronization information, characterized in that it comprises a step in which the user adds to the data stream at least one additional NAL whose content and position in the stream are known to the decoder in order to increase the length on which synchronization takes place.

The structure of the transmitted information is, for example, in the form of a structure of encapsulation of data used, a structure which may be used as a basis for creating new structures transporting error-correcting information, characterized in that it comprises a step in which the user adds at least one such additional structure containing redundancy and the information necessary for:
the identification of the additional structure as a redundancy structure,
the identification of the initial data structures to which the redundancy relates,
the error-correcting code used to transmit the data.

The data are for example multimedia data encoded by the H.264 standard, the data being encapsulated in a structure of the network abstraction layer or NAL type, and the user inserts at least one redundancy NAL containing the information necessary for:
the identification of the structure as a redundancy NAL,
the identification of the initial data structures to which the redundancy relates,
the error-correcting code used to transmit the data.

The redundancy NAL may be added during the initial compression encoding operation.

The redundancy NAL is, for example, added when the data to be transmitted enter a transcoder.

A redundancy NAL may be placed before an NAL of information (of video data) and the header of the redundancy NAL comprises a field indicating the error-correcting code used.

For example, in the redundancy NAL header the user includes a field indicating the number of the video NAL to which the redundancy applies.

It is possible to add to the redundancy NAL header a field indicating the various NAL numbers to which the redundancy NAL applies.

For example, the Reed-Solomon code is used as the error-correcting code.

The invention also relates to a device for protecting data in a transmission system in which the information structure transmitted is in the form of a structure of encapsulation of data used, a structure that may be used as a basis for creating new structures transporting synchronization information, characterized in that it comprises at least one encoder comprising a processor suitable for executing the steps of the method specified above.

The invention notably has the following advantages:
- it allows protection at the application level, therefore as close as possible to the video encoding equipment, while remaining compatible with the video standard used and with the rest of the transmission chain, since the user no longer depends on the low layers,
- it ensures compatibility with the video standard in question (H.264 AVC),
- it provides ease of installation and transparency relative to the existing solutions,
- it allows increased protection against errors.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1, the format of a type 12 NAL used by the method according to the invention to increase redundancy by the addition of a "blank" NAL, FIG. 2, the distribution of payload/redundancy data in the case of a Reed-Solomon (RS) code, FIG. 3, an example of the index table for the RS code, FIG. 4, an example of inserting protection via an RS code, FIG. 5, an example of decoding with the use of protection by RS code, FIGS. 6 to 9, result curves obtained with protection by RS code, FIG. 10, an example of one video NAL/one redundancy NAL protection, and FIGS. 11A, 11B and 11C, two examples of application in the case of the combination of N video NALs and M redundancy NALs.

DESCRIPTION OF THE PREFERRED EMBODIMENT

The invention notably relates to the protection of data compressed by the H.264/AVC standard against errors.

Notably it involves using the network abstraction layer or NAL structure of the H.264/AVC standard to insert redundancy in order to protect the stream against the residual errors, while retaining compatibility with the video standard.

The invention also applies for the multimedia standards or methods that notably have the feature of being able to discriminate the bits while complying with the conditions of encoding contexts or of final rendering (e.g. visual impact).

The invention may apply to all the standards which have at least one payload data encapsulation structure, an encapsulation structure which may be reused as a basis for creating new structures transporting synchronization, redundancy information making it possible to render the stream more robust against errors.

In summary, the invention has, for example, the following two forms:
1. the use of NALs with no particular information or "blank" such as typically the type 12 NALs initially provided for padding,
2. addition of additional NALs carrying redundancy (introduction of a new type of NAL comprising the information of the encoder used and carrying as a payload the redundancy generated on the transmitter side).

This addition of redundancy (of whatever type) may be carried out either directly during the initial compression encoding operation, or added during entry in a transcoder. Specifically, the transcoder, capable of interpreting the structure of the bit stream, is a tool that also makes it possible to modify it in order to, if necessary, change the format, the bit rate, the resolution of the stream. Such a tool may therefore also be used in the context of the invention to add redundancy, or remove this. This addition of redundancy may be of several types:
a) NAL by NAL redundancy, in order to fight against bit losses or deletions. An information NAL is then protected by a redundancy NAL,
b) redundancy across the NALs, in order to fight against packet losses.

NAL Syntax

The H.264/AVC bit stream is divided into several network abstraction layers or NALs, that are separated by a start code with a format 0x00 . . . 0x00 0x01 (at least three bytes). The first two NALs in a stream contain the general information on the video to be decoded, the first is the SPS (Sequence Parameter Set) and the second NAL is the PPS (Picture Parameter Set) which relates to the picture parameters.

The SPS NAL contains the information necessary for decoding the rest of the sequence: macro block frame or field, buffer memory size of the reference pictures, picture order counter type, level and profile IDC.

The PPS NAL contains the rest of the values necessary for decoding: the type of compression (arithmetic or variable length coding), number of possible reference pictures, weighted prediction flag, initial and chroma offset quantization parameters. During encoding, several types of parameter sets may be used (the change always occurring at the beginning of a group of pictures or GOP), which means that each new parameter set must be identified. For simplicity, and without loss of generalization, the examples given below will consider the case in which only one SPS layer and one PPS layer have been generated at the beginning of a sequence.

After having decoded these first two NALs, the decoder receives the real video datum, corresponding to portions of pictures or "slices". This datum is contained in a type 5 NAL (IDR), or type 1 (unpartitioned and non-IDR video data), or in type 2, 3 and/or 4 NALs for partitioned video data, comprising a slice header and the slice datum that contains the coded macro blocks in the slice (by misuse of conventional language in the case where the user is in data partition mode for which the slice corresponds to all the type 2, 3 and/or 4 NALs).

The header contains the information making it possible to interpret the datum. The information gives: the number of the first macro block, the type of slice to be decoded (I, P, SI/SP, or B), the picture parameter set to be used, the number of the current frame, the type of the current frame (e.g. is it an IDR frame) and the POC. Then data dependent on the type of slice follow.

Therefore, a slice header I notably contains information on the possible use of the frame in question as a long term reference. Similarly, a slice header P notably contains reference information: the number of the reference images and flags indicating whether or not it is necessary to reorder the reference picture list, use of an adaptive reference buffer memory, having the function of switching a short term reference picture to long term reference picture. Finally, one of the important syntax elements of the slice header (both I and P) is the additional quantization parameter (Slice_QP_Delta) that is valid for the whole slice.

Adding Slices: The Case of "Blank" NALs

The idea of the present invention is notably to use one or more redundant NALs (in the sense that they do not carry additional useful information) in order to increase the length of the message to which correlation techniques are applied.

This can be done, for example, by using type 12 NALs, defined in the H.264 standard as padding NALs, of which the "payload" portion is filled with 1. Then, since the NAL is perfectly known (its header is standard, the data portion is filled with 1), it can be placed in front of any video data NAL and the assembly NAL 12 and start word (start code) of the data NAL can therefore be seen as a super start word (or "super start-code") on which the correlation can be carried out. Producing a correlation not on three or four bytes (the size of a normal start code) but on ten or so, the risks of a false alarm if noise is present are greatly reduced and it is therefore possible to improve the detection of the start of video data NALs disrupted by binary errors.

This can be generalized to the use of other types of NAL chosen from the reserved values. In practice, unless it is desired to transport other information by means of this additional NAL (for example redundancy information), it is preferable to use an NAL that is predefined (therefore known to the encoder and decoder), which prevents the risk of malfunction of a weak encoder (a crash after encountering an undefined NAL value for example).

The size of the NAL itself can be decided freely and can be adapted to the transmission conditions (adapting to the correlation capabilities that it is desired to obtain with regard to the introduced losses of efficiency). It can be fixed by default or can be used to carry additional information, for example, by establishing a link between the length of the NAL and the type of the next NAL.

FEC: Example of Correcting Code by Means of Reed-Solomon Codes

Error-correcting code is a technique used in many applications, for example, storage applications (e.g. CD-Rom) or, naturally, the field of wireless transmissions that are made over an error-prone transmission channel. Its principle is to add redundancy to the data, which will allow a decoder to verify whether the datum has been corrupted, whether there have been lost bits or else whether the value of the bits has been modified (inversion of 0 to 1 or vice versa). The idea is to reduce the impact of the errored bits and errored packets on the decoding.

Also called Forward Error Correction (FEC), error-correcting code can be introduced at several levels. Usually, it is implemented on the transmission channel or the network, but it may also be included at the application level (typically in the source encoding operation). This is particularly worthwhile when it is desired to apply the error correction FEC directly linked with the data to be protected.

A well known example of FEC code is the Reed-Solomon code used in digital communications (wireless and satellite communications, DVB Digital video broadcasting, ADSL) and storage (CD, DVD, bar code). These codes are subassemblies of BCH codes and are linear block codes. A Reed-Solomon code is specified as RS(n,k) code with m-bit symbols.

This means that the coder takes k data symbols of m bits each and that it adds parity symbols in order to make a code word of n symbols. There are (n-k) parity symbols of m bits each. A Reed-Solomon decoder can correct up to t symbols (t integer) which contain errors in a code word where $2t=n-k$.

Adding Slices: Case of "Filled" NALs

As specified above, the video datum also called the video coding layer (VCL) is encapsulated by an NAL header in order to generate a network abstraction layer or NAL. This header usually consists of a single byte which contains:

A forbidden bit which must be equal to zero,
Two bits which give information on the VCL contained in the NAL. If it is equal to zero, then the slice will not be used as reference,
5 bits on which the NAL type is encoded, which gives information on the type of slice that it contains: IDR, data partition, sequence parameter, picture parameter set.

In order to remain compatible with the standard and to transport redundant information, a new type of NAL may be created, which will be numbered below without loss of generality as being type 24, one of the reserved values defined by the standard.

Figure 10:
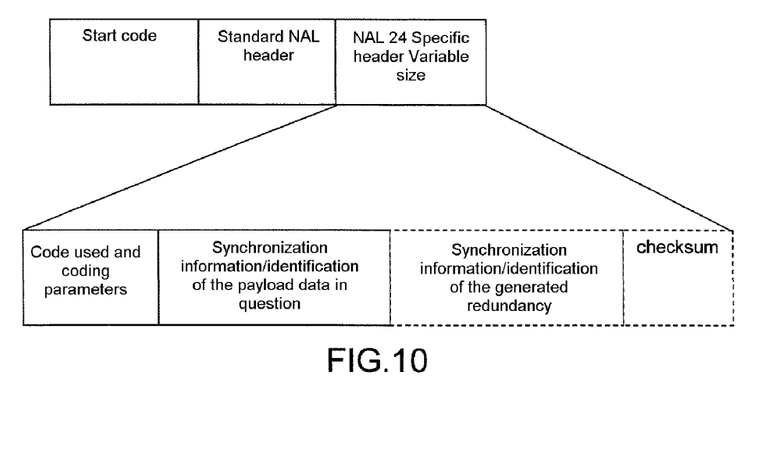

To indicate the error-correcting code that has been used and the original video frame to which this redundancy relates, the user then adds one or more bytes immediately after this generic NAL header, thereby creating a specific NAL header of the redundancy NAL format according to the invention, as illustrated in FIG. 10. Taking the example in which the redundancy NAL protects a single original frame in mono-slice mode (one slice per frame), one byte may be sufficient to encode the specific NAL header: this byte specifically makes it possible to encode the index of an RS table indicating the size of the code used, the number of the frame (by copying the frame_num field or POC on four bits) of payload data to which this redundancy NAL relates. Therefore, by encoding the index on four bits, the user has the choice of 16 different RS codes, assuming that the table is known both at transmission and reception.

The sizes and formats are chosen according to the applications. The power of correction is given for example by the bit rate K/N which corresponds to the quantity of source data, K, compared with the quantity of redundancy, N.

The advantage of such a solution is to offer the possibility of applying Unequal Error Protection (UEP) by simply modifying the output of the error-correcting code according to the type of NAL to be protected.

Example of Use: Case where a Redundancy NAL Protects a Single Initial Data NAL

Figures 1, 2:
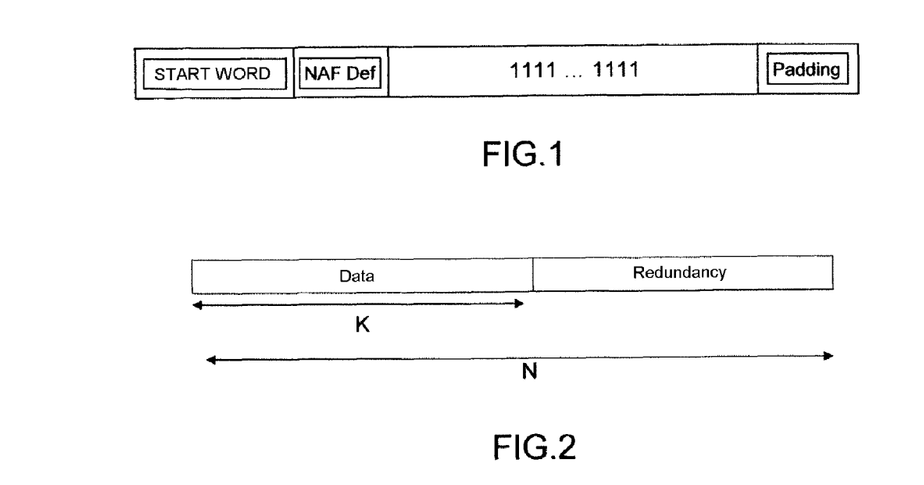
Figure 3:
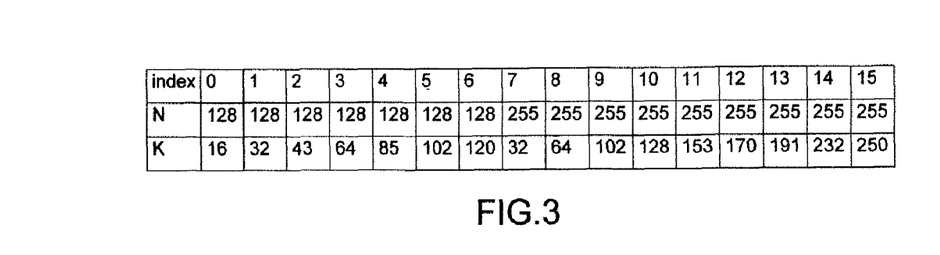
Figure 4:
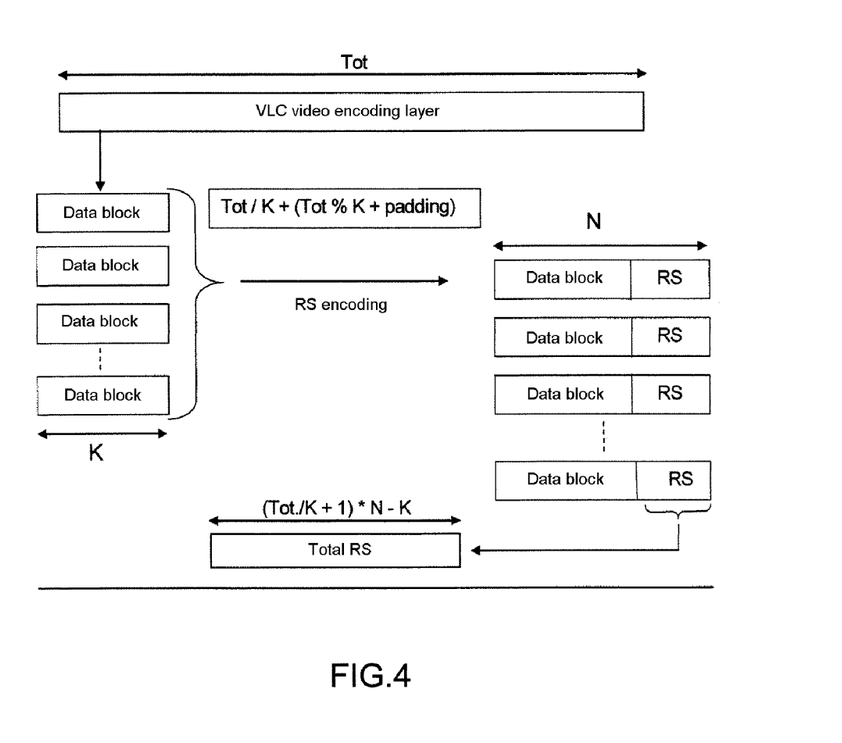
Figure 5:
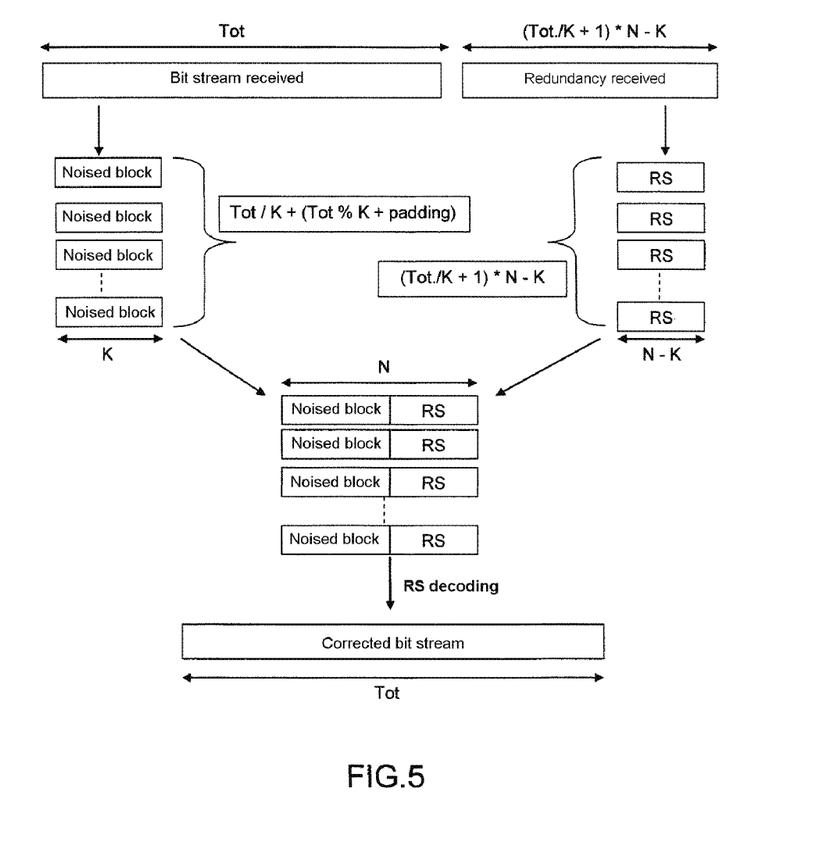

The RS encoder can then start by dividing the bit stream into several blocks of K bytes. If the length L of the bit stream is not a multiple of K, the last block is padded with zeros. Each of these blocks is then sent to the RS encoder which generates the source blocks and the N-K redundancy bytes. These bytes are stored for each encoded block, and their stream of length $(N-K) \cdot (L/K+1)$ obtained is encapsulated inside the RS NAL, as illustrated in FIG. 4 giving an example of insertion of protection by an RS code.

On the side of the decoder, a standard decoder will not consider the additional frames, so it will not be disrupted by their presence.

Figure 6:
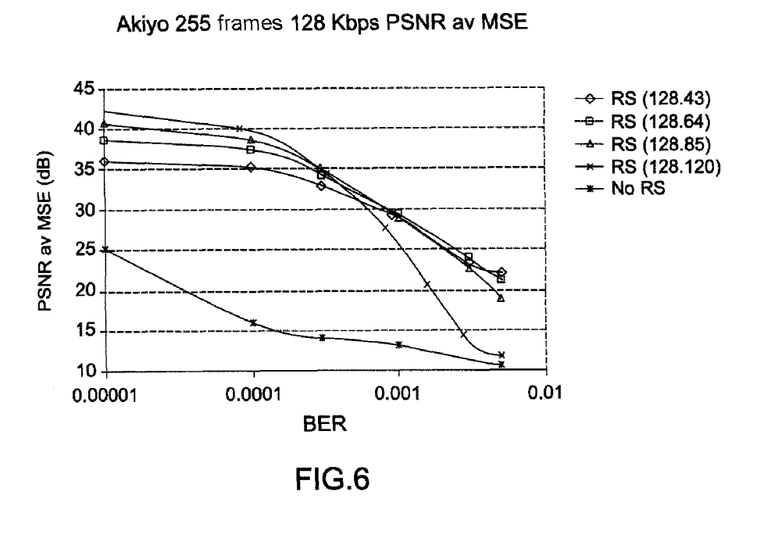
Figure 7:
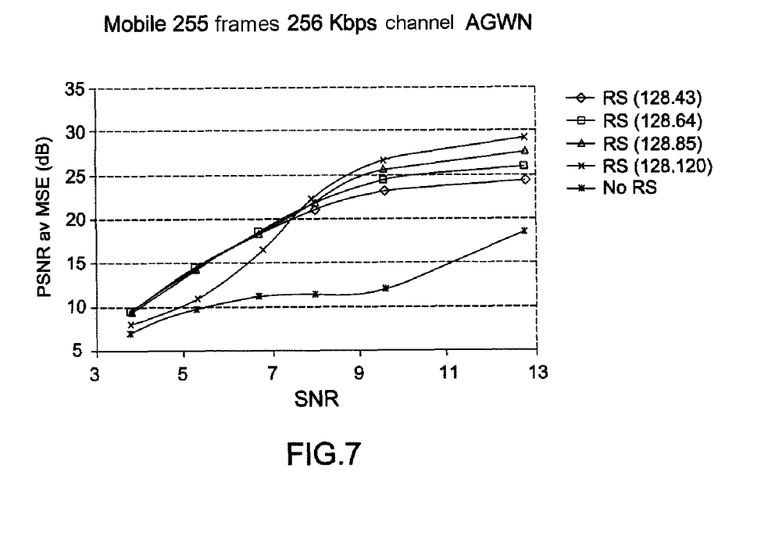

On the other hand, the decoder having knowledge of the invention and therefore aware of the potential presence of the additional NALs can take advantage of the correcting code. Specifically, on receipt of an NAL, it will check the type of this NAL and verify that it corresponds to a video datum (i.e. NAL 5: IDR, NAL 1: I, P, etc.). If it is the case, the next NAL is then extracted (retrieved) from the bit stream and its type and its specific header will be checked to ensure that it contains the information relative to the NAL of video data in question. In the case of wireless transmission, the channel does not introduce any delay, so the two NALs will arrive in their order of transmission. In the case of a transmission in which a delay may be introduced (passing through a packet-switched transmission network for example), a process of placement in buffer memory makes it possible to obtain the necessary reordering. The two NALs can therefore be processed simultaneously and separated into blocks of the correct size in order to recreate the original RS symbols: the redundancy is therefore divided into blocks which are concatenated with the blocks of size K of the data stream. The blocks of size N obtained are then decoded by the Reed-Solomon decoder which supplies at the output corrected decoded words of size K. These words may then be reassembled to generate the corrected video data NAL, this reconstructed bit stream then being able finally to be processed by the standard decoding program, as illustrated in FIG. 6.

Examples of Results Obtained:

Several simulations were made, using Reed-Solomon codes RS(128,43), RS(128,64), RS(128,85) and RS(128, 120). Three reference video sequences ('Foreman', 'Mobile Calendar' and 'Akiyo' ITU-T sequences) with 255 frames for each sequence. 'Akiyo' is a video called the "head and shoulders" type with very little movement between the frames, whereas 'Mobile Calendar' includes many more movements and the appearance of objects. The 'Foreman' sequence is a compromise between the two. The size chosen for the GOP is 15 frames and a maximum of five frames may be used as reference. The videos were encoded to obtain fixed bit rates for the transmission channel: 'Foreman' and 'Akiyo' at 128 kb/s and 'Mobile Calendar' at 256 kb/s. Therefore, when the average redundancy level varies, the source bit rate considered also varies: if the encoding output increases, that of compression diminishes and vice versa, which explains that at a high signal-to-noise ratio, in the absence of error, the PSNR values are not identical. Finally, the results given are provided for three different types of channel: binary symmetric channel (BSC), additive white Gaussian noise (AWGN) channel and Gilbert-Elliot channel (representative of a transmission by frame over a wireless channel). It is observed that the performance, excluding error-protective code, is, except possibly over a virtually perfect channel, much inferior to that obtained with the addition of redundancy NALs. In the case in question, it is therefore possible to recommend the use of either a very high FEC encoding output (e.g. RS(128,120)) for channels with not much noise, then an average FEC encoding output (e.g. RS(128,85)) for channels with a little more noise (BER>$10^{-3}$).

Figure 8:
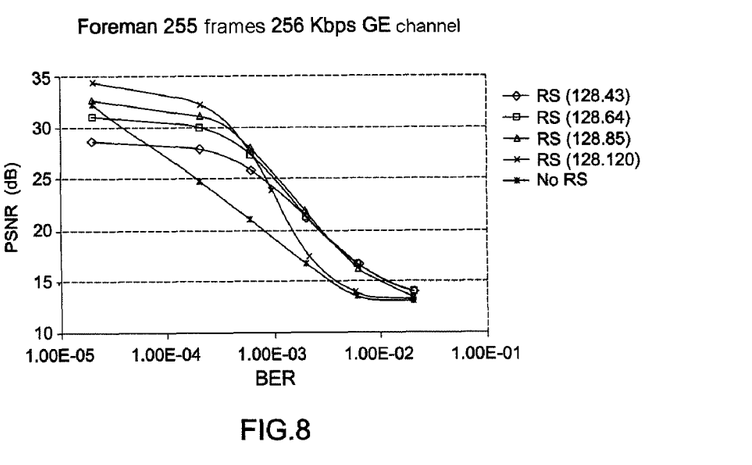
Figure 9:
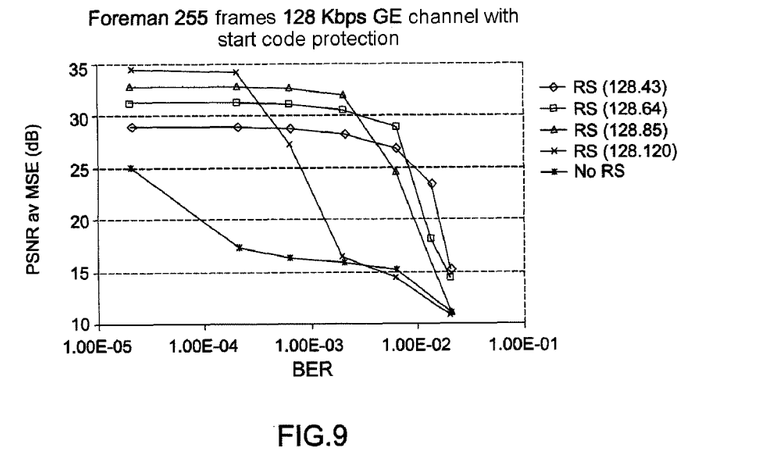

Finally, FIG. 9 shows the result obtained by combining the use of start-code (here simulated as perfect) and error-correcting code protection: the comparison of the results obtained with those of FIG. 8 shows the value of start-code protection.

Possible Protection Modes According to the Invention:

The examples given above have been detailed in the case where a video data NAL is directly protected by a redundancy NAL, said redundancy being generated by Reed-Solomon codes. Without departing from the context of the invention, the method applies to the use of other FEC codes. In addition, it can also be generalized to other protection schemes, which can make it possible to fight against different types of error, to optimize the quantity of redundancy introduced or to adapt to the transmission constraints.

1 info NAL-1 redundancy NAL (the case detailed above)

According to another embodiment, it is also possible to use the following scheme:

1 info NAL-M redundancy NALs

This case can be considered notably for reasons of size when the output of the FEC code is less than ½, so the redundancy NAL exceeds the size of the data NAL, the size which may have been fixed as a function of the constraints existing on the transmission network (e.g. MTU (Maximum Transfer Unit) size for transmissions over the IP network). In this case, the model explained above is easily generalized by defining in the additional header of the redundancy NAL a field indicating, in addition to the number of the video NAL to which redundancy applies, the sequence number of said redundancy.

N info NALs-1 redundancy NAL

This case may be considered notably when use is made of very high output redundancy and therefore the redundancy NALs will have a very small size, possibly not very well suited to the transmission that follows (for example to placement in an RTP packet which could generate a high rate of padding). In this case, the model explained above is easily generalized by defining in the additional header of the redundancy NAL a field indicating, not the number of the frame in question, but the various numbers and a possible information on size or position for each of the concatenated redundancies.

N info NALs-M redundancy NALs

This case, similar to a block encoding scheme, has the value that it allows a fight against packet errors if care is taken to generate the redundancy, not NAL by NAL, but in a transverse manner. In this case, the model explained above may be generalized by generating the redundancy, by arranging the data NALs in line in a matrix which will be read in a column at the input of the FEC encoder and then by defining, in the additional NAL header of each redundancy NAL, the information necessary for the reverse operation of decoding: size of the matrix, sequence number of the redundancy NAL, respective position (or sizes) of the video data NALs in the matrix. If necessary, it is also possible to propose that, to simplify the transmission and reduce the size of the redundancy NAL headers, the information describing the redundancy matrix (FEC code used, matrix size, number and position or size of the data NALs in the matrix) is transmitted in a particular redundancy NAL (if necessary protected by a CRC and/or repeated for the purpose of fighting against its loss) and that the redundancy data as such is transmitted in redundancy NALs of the conventional type mentioned above with the additional sequence number information.

FIG. 10 represents the specific NAL header according to the invention. Its size is therefore variable, because it fluctuates greatly depending on whether consideration is given to the case in which there is 1 video NAL/1 redundancy NAL or that in which N information NALs are protected by M redundancy NALs. In all cases, the specific header of NAL 24 is placed after the standard NAL header (one byte) for example itself situated after the "start code" which may be on 3 or 4 bytes.

NAL 24 consists of a portion I containing the code used and the encoding parameters, a portion II containing information of synchronization/identification of the payload data in question, information of synchronization/identification of the redundancy generated (portion III) and a portion IV or checksum, the latter two portions being optional.

In the particular case in which there is one video NAL/one redundancy NAL, it is possible to deduce from the code used any information necessary for the synchronization of the generated redundancy. The schematic may then be given (as specified above, one byte may suffice) as follows:

| Index of correcting code used | Number of the video data frame (frame_num) |
|---|---|
| 4 bits | 4 bits for example |

In practice, it is also possible to choose to place the redundancy NAL directly after the data NAL and therefore to avoid supplying the frame number (information that can in any case be noisy or insufficient in the event of "multi-slice" encoding) and therefore increase the number of code possibilities (256 index values if the 8 bits are taken for example). Naturally, in this type of simplified case, the encoder and the decoder must first be in agreement on the meaning of the various bits of the specific header.

In the case in which it is desired to retain the possibility of proposing with this same type 24 NAL several modes of protection, the user introduces a signaling field specifying the syntax to follow. In this manner, the decoder knows what it must expect and how to process the data. In the case considered below in which the subtype is on 2 bits, the case N=1/M=1 can be given as subtype '11'. Then follows the field indicating the code used (field I, for example 6 bits), and if necessary a frame number field making it possible to identify the data NAL may be present (field II).

| Red NAL Subtype | Index of the correcting code used | Number (frame_num) of the video data frame |
|---|---|---|
| E.g.: 2 bits | E.g.: 6 bits | E.g.: 4 bits |

Finally, it is also possible to add a CRC (field IV optional) making it possible to validate the extended header of the redundancy NAL in order to be sure of the values used to carry out the error-correcting decoding operation.

This leads to the following diagram:

| Red NAL Subtype | Index of the correcting code used: | Number (frame_num) of the video data frame | CRC |
|---|---|---|---|
| E.g.: 2 bits | E.g.: 6 bits | 4 bits | 4 bits |

Figure 11A:
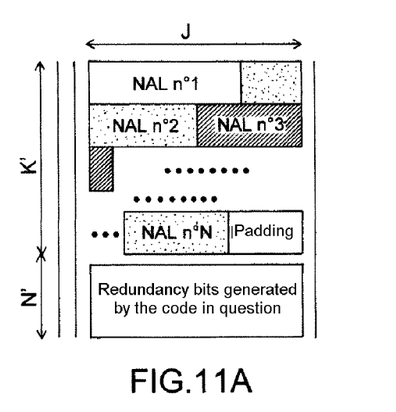
Figure 11B:
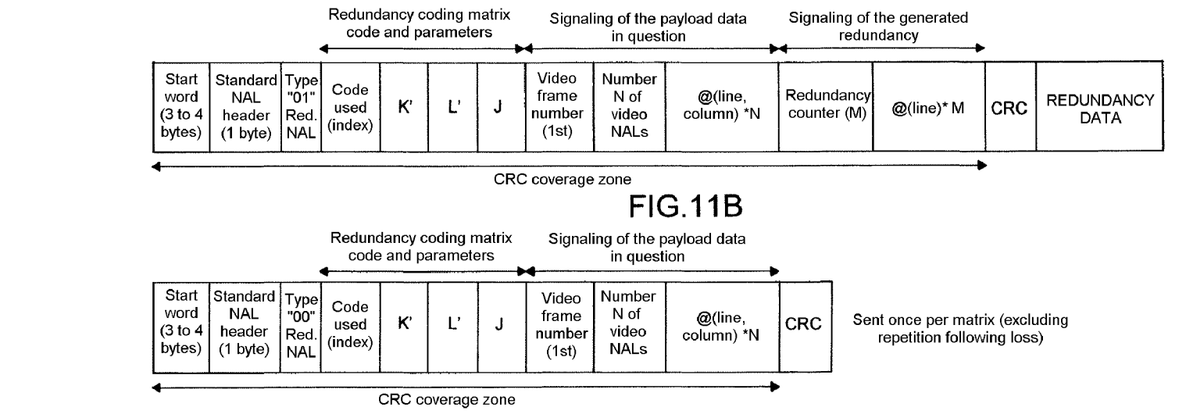
Figure 11C:
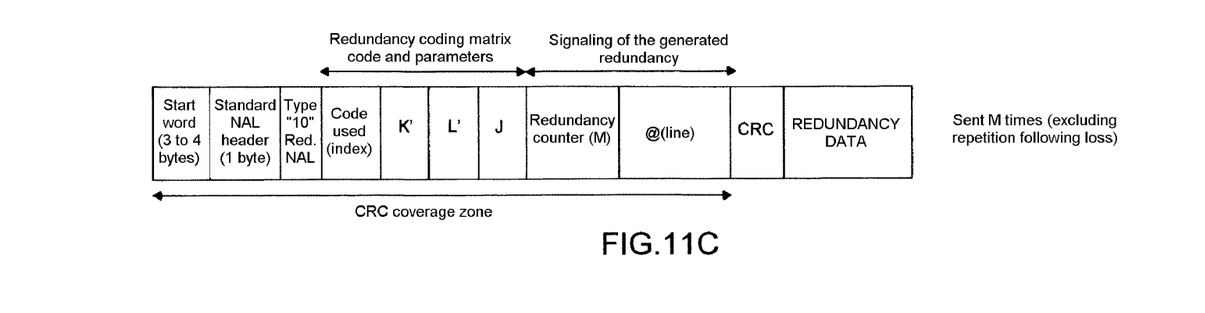

FIGS. 11A, 11B and 11C correspond to the case N video NALs/M redundancy NALs.

In the more usual case in which several (N>=1) video data slices are considered in order to generate one or more (M>=) redundant data slices, the user chooses in a first time a payload data processing mode.

FIG. 11A represents a method of matrix arrangement of the payload datum, for example, by line, which makes it possible to reread the data, for example by column and thereby generate a transverse redundancy distributed over all the N slices.

The redundancy bits thus generated by means of an output code K/N may then be regrouped into M redundancy NALs. The choice of regrouping is made for example relative to an average target size of these redundancy NALs. To make it possible to distribute the effects of the errors as well as possible, this redundancy will be reread line by line.

This therefore shows the necessity of signaling the following synchronization/identification information:

Positioning of the N video data NALs in the top portion of the matrix, that is a start-NAL line+column address for each, Positioning of the M redundancy NALs in the bottom matrix of the matrix (or in practice, if the user restricts himself to creating such aligned NALs at the beginning of lines, a line address for each redundancy NAL) naturally with the information of the value of N (number of data NAL positions in the matrix) and of M (redundancy number counter).

It is also possible to indicate for information the frame number (frame_num) of the first slice, in order to make it possible, for example, to differentiate frames belonging to two different matrices.

For practical reasons, depending on the value of N, the output N/K and therefore the size of the matrix in question, it could be desired:

Either to place in each of the M redundancy NALs (called subtype 01, for example) the complete information describing the matrix, which makes it possible very easily to process the packet losses since the size of the lost packet and the exact position of the lost words are then perfectly known simply by the difference of addresses of the various NALs;

Or distribute the matrix description information to the nearest in terms of bits used, for example, by placing all the DATA signaling in a first NAL (called subtype 00, for example) which will not contain redundancy words and then in each NAL (called subtype 10, for example) containing the redundancy, supply the redundancy signaling itself and the repeat of the encoding parameters.

The format obtained is given in FIGS. 11B and 11C.

The steps described above apply notably in a transmission system comprising at least one encoder provided with a processor capable of executing the aforementioned steps and a decoder fitted with a processor suitable for decoding the message.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for protecting data in a transmission system where the data are multimedia data encoded by a H.264 standard, the data being encapsulated in a structure of a network abstraction layer or a NAL type, said method comprising:

adding to an information structure at least one additional network abstraction layer (NAL), containing information for identification of the structure as a redundancy NAL, identification of initial data structures to which the redundancy relates and error-correcting code used to transmit that data, content and position of the NAL in the information structure being known to a decoder of the transmission system, and additional NALs comprising information of an encoder used and carrying as a payload the redundancy as generated on a transmitter side of the transmission system.

2. The data protection method as claimed in claim 1, wherein the structure of encapsulation is configured to transport synchronization information.

3. The data protection method as claimed in claim 1, wherein the structure of encapsulation is configured to transport error correction information, and the method further comprise adding at least one structure of encapsulation containing redundancy and information necessary for:
- identification of the structure of encapsulation as a redundancy structure,
- identification of the structure of encapsulation to which the redundancy relates, and error-correcting code used to transmit the data.

4. The method as claimed in claim 1, wherein the redundancy NAL is added during an initial compression encoding operation.

5. The method as claimed in claim 1, wherein the redundancy NAL is added when the data to be transmitted enter a transcoder.

6. The method as claimed in claim 1, wherein the data are video data, the redundancy NAL is placed before an NAL of information of the video multimedia data (Video NAL), the redundancy NAL has a header, and the header of the redundancy NAL comprises a field indicating the error-correcting code used.

7. The method as claimed in claim 6, wherein the header of the redundancy NAL further comprises a field indicating a number of the video NAL to which the redundancy applies.

8. The method as claimed in claim 6, wherein the redundancy NAL header further comprises a field indicating the various NAL numbers to which the redundancy NAL applies.

9. The method as claimed in claim 1, wherein the error-correcting code is a Reed-Solomon code.

10. A device for protecting data in a transmission system where the data are multimedia data encoded by a H.264 standard, the data being encapsulated in a structure of a network abstraction layer or a NAL type, the device comprises at least one encoder comprising a processor configured for executing the steps of the method as claimed in claim 1.

\* \* \* \* \*